United States Patent
Busch

(10) Patent No.: US 9,379,581 B2
(45) Date of Patent: Jun. 28, 2016

(54) DRIVE UNIT, PARTICULARLY FOR A REVOLVING DOOR, WITH AN ELECTRONICALLY COMMUTATED MULTIPOLE MOTOR

(71) Applicant: Sven Busch, Dortmund (DE)

(72) Inventor: Sven Busch, Dortmund (DE)

(73) Assignee: Dorma Deutschland GmbH, Ennepetal (DE)

( * ) Notice: Subject to any disclaimer, the term of this patent is extended or adjusted under 35 U.S.C. 154(b) by 211 days.

(21) Appl. No.: 14/153,862

(22) Filed: Jan. 13, 2014

(65) Prior Publication Data

US 2014/0197711 A1 Jul. 17, 2014

(30) Foreign Application Priority Data

Jan. 14, 2013 (DE) .......................... 10 2013 000 417

(51) Int. Cl.
*H02K 1/22* (2006.01)
*H02K 1/06* (2006.01)
*H02K 1/14* (2006.01)
*H02K 7/14* (2006.01)

(52) U.S. Cl.
CPC .................. *H02K 1/148* (2013.01); *H02K 7/14* (2013.01); *H02K 2201/15* (2013.01)

(58) Field of Classification Search
CPC .............. H02K 1/14; E05F 15/63; E06B 9/70
USPC ............... 310/216.023, 236, 254.1, 267, 268, 310/406, 216.016
See application file for complete search history.

(56) References Cited

U.S. PATENT DOCUMENTS

| | | | |
|---|---|---|---|
| 2008/0008590 A1* | 1/2008 | Yeh ........................ | F04D 29/057 416/174 |
| 2009/0284104 A1 | 11/2009 | Knorr et al. | |
| 2012/0005961 A1* | 1/2012 | Busch ................... | E05F 15/608 49/46 |
| 2012/0025661 A1* | 2/2012 | Sakane ................... | H02K 3/522 310/215 |

FOREIGN PATENT DOCUMENTS

| | | |
|---|---|---|
| DE | 10 2006 015 065 A1 | 10/2007 |
| DE | 10 2010 024 108 A1 | 12/2011 |
| GB | 1395976 A * | 5/1975 ............... H02K 1/12 |

* cited by examiner

*Primary Examiner* — Dang Le
*Assistant Examiner* — Jose Gonzalez Quinone
(74) *Attorney, Agent, or Firm* — Cozen O'Connor

(57) ABSTRACT

A drive unit for a door includes an electronically commutated multipole motor having: a stator part configured to be arrangable at a stationary structural component part; and a rotor part configured to be gearlessly connectable to a rotationally drivable element. The stator part and the rotor part include sheet metal elements stacked in a package-like manner. The sheet metal elements of the stator part and the sheet metal elements of the rotor part extend parallel to one another.

15 Claims, 3 Drawing Sheets

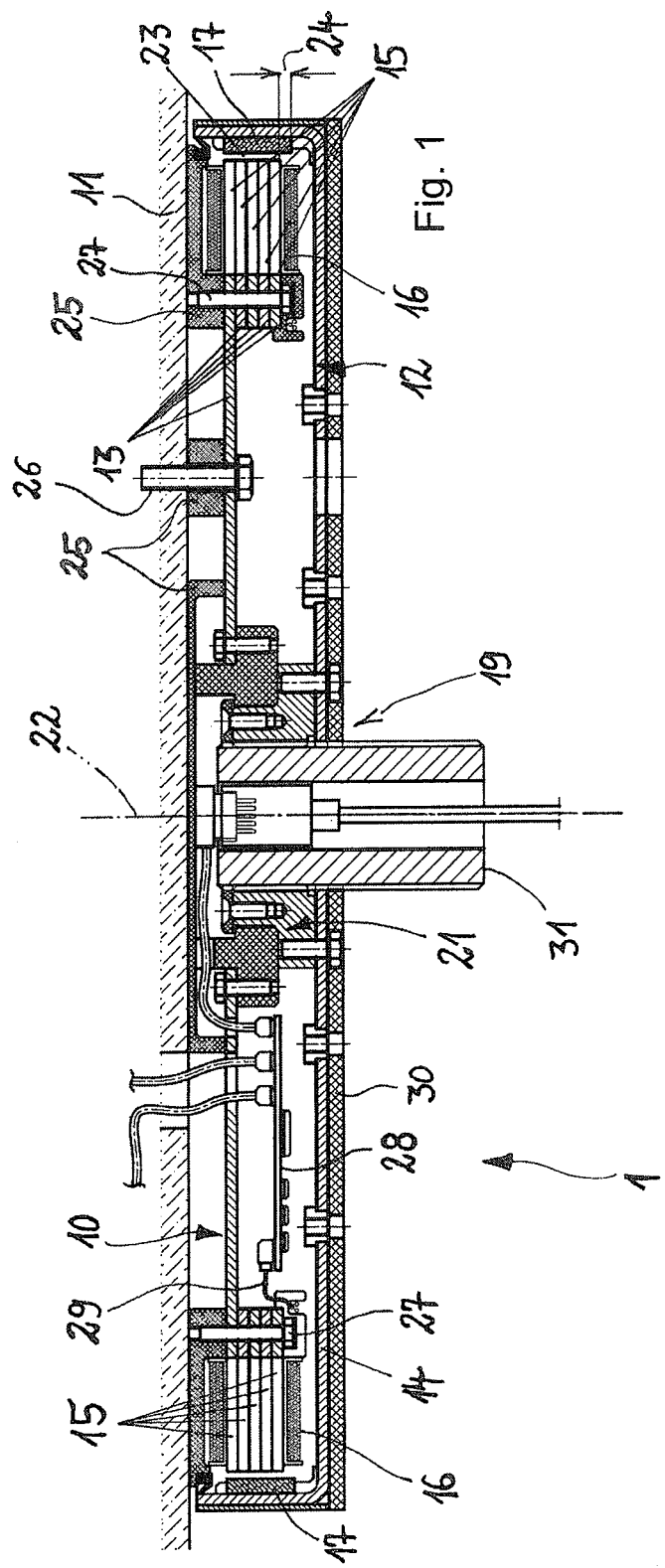

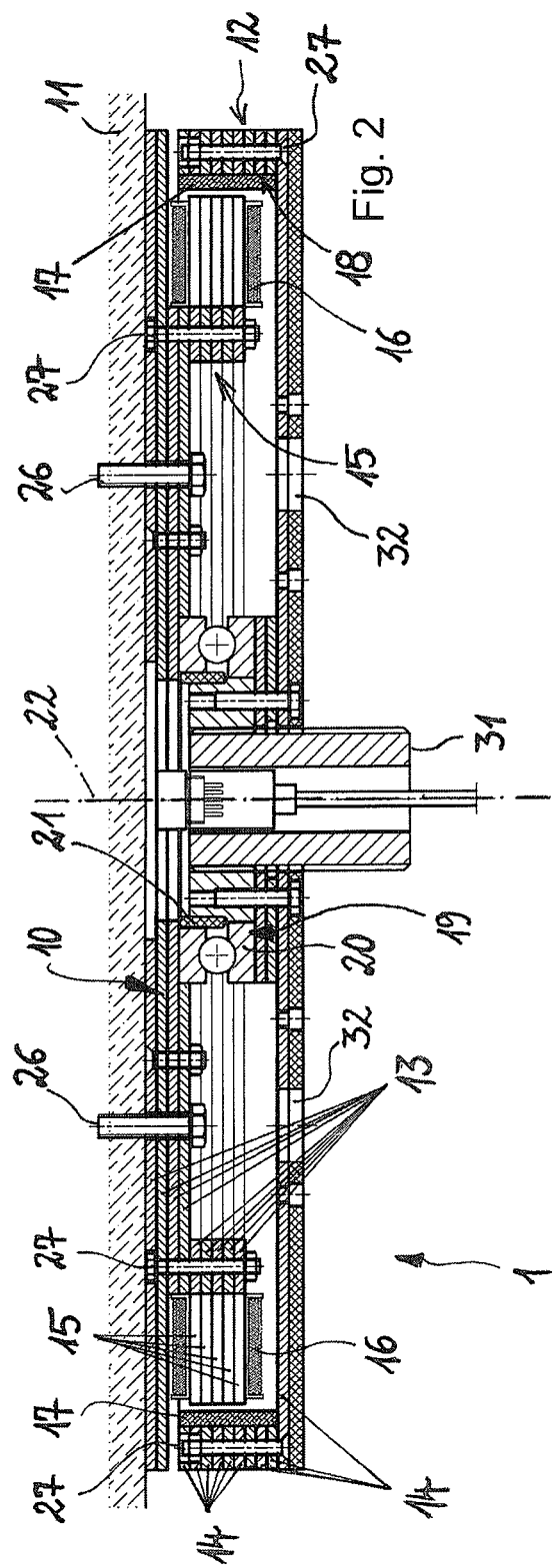

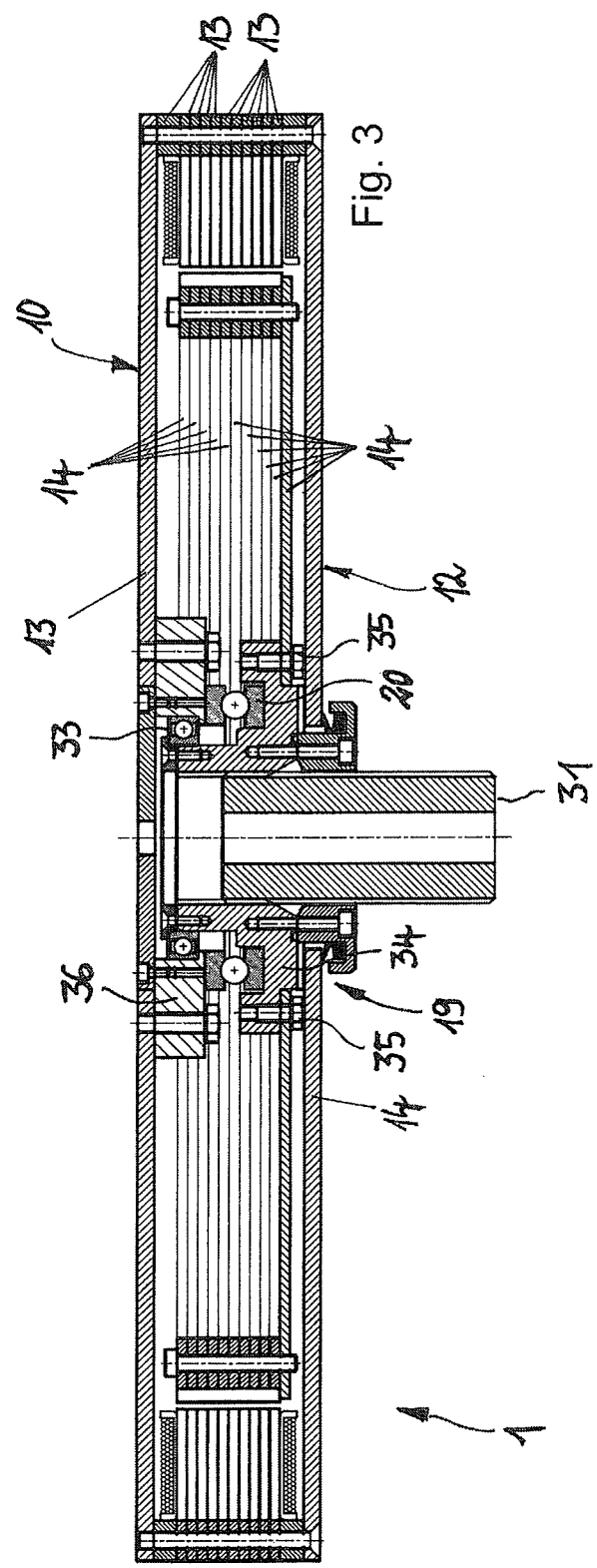

DRIVE UNIT, PARTICULARLY FOR A REVOLVING DOOR, WITH AN ELECTRONICALLY COMMUTATED MULTIPOLE MOTOR

BACKGROUND OF THE INVENTION

1. Field of the Invention

The present invention is directed to a drive unit, particularly for a revolving door, with an electronically commutated multipole motor. The invention is further directed to a revolving door with a drive unit comprising an electronically commutated multipole motor.

2. Description of the Related Art

DE 10 2006 015 065 A1 describes a drive unit with an electronically commutated multipole motor, also known as a torque motor. The torque is generally achieved by a stationary stator that transmits the torque directly to the rotor via the air gap. This drive concept dispenses with mechanical transmission elements such as gearboxes and, accordingly, also with the inaccuracies caused by the mechanics of gearboxes. Further, the multipole motor offers a virtually wear-free and maintenance-free operation. The multipole motor has a stator part, which is flanged to a structural component part of a machine, for example. Further, the multipole motor has a rotor which is annularly constructed and is rotatably received at the stator.

DE 10 2010 024 108 A1 shows a drive unit for a revolving door constructed as an electronically commutated multipole motor. The multipole motor has a disk-shaped, flat configuration and is described as having a build height of less than 80 mm. Accordingly, the multipole motor is suitable in a particularly advantageous manner for driving the turnstile of the revolving door, particularly since no gearbox is necessary for transmitting the rotational movement of the rotor part of the multipole motor to the turnstile.

Multipole motors have a quantity of coil elements and a quantity of magnet elements. The coil elements are preferably arranged at the stator part and the magnet elements are preferably arranged at the rotor part. When the coil elements are supplied with current under electronic commutation, a magnetic field surrounding a drive axis is achieved by successively energizing the coil elements, resulting in a rotational movement of the rotor part at the stator part. The stator part is often formed of housing components in which the rotor part rotates concentric to the axis of symmetry of the housing. To improve the magnetic field circuit, the coil elements have ferrite cores on which wound components are arranged. The magnet elements can also be received by ferritic elements which likewise optimize the magnetic field circuit. The ferritic elements for receiving the wound components of the coil elements and magnet elements are usually arranged at the housing components of the multipole motor. This results in a complicated construction which often comprises castings and component parts which are machined by cutting and is designed so as to achieve the best possible sealing of the area between the rotor part and the stator part. There is also the drawback that multipole motors are frequently enclosed by housings from which an output shaft projects, which must likewise be sealed. The basic construction of motors of this kind is essentially longitudinally cylindrical, and an armature rotates along the axis of symmetry of the longitudinally cylindrical stator housing.

SUMMARY OF THE INVENTION

Proceeding from the disadvantages of the prior art, it is an object of the invention to provide a drive unit with an electronically commutated multipole motor, wherein the multipole motor is constructed so as to be as flat as possible and is formed of simple elements. In particular, an object of the invention is to construct a multipole motor in a simple manner with a shape that qualifies the multipole motor for installation in a revolving door so that it can be used in a simple manner to drive the turnstile of the revolving door.

This object is met, according to one aspect of the present invention, by a drive unit formed especially for a revolving door and constructed with an electronically commutated multipole motor, wherein the multipole motor has a stator part arranged at a stationary structural component part, and wherein the multipole motor has a rotor part gearlessly connected to a rotationally drivable component, particularly to a turnstile of the revolving door, wherein the stator part and the rotor part are formed substantially of sheet metal elements stacked in a package-like manner, and wherein the sheet metal elements of the stator part and the sheet metal elements of the rotor part extend parallel to one another.

According to an aspect of the invention, an electronically commutated multipole motor, which can have a flat, dish-like shape so as to advantageously serve to drive the turnstile in a revolving door, can be provided in a simple manner by the construction of the rotor part and stator part, according to an aspect of the invention, with sheet metal elements extending parallel to one another. A volume body, which in particular can have a disk-shaped or cup-shaped form, can be achieved when the sheet metal elements are stacked in a package-like manner. Also, the stator part or the rotor part can be formed using only one sheet metal element or a few sheet metal elements. Accordingly, the stator part can advantageously have a disk shape or a cup shape and the rotor part can likewise have a disk shape or a cup shape. The sheet metal elements for forming the stator part and the sheet metal elements for forming the rotor part need not have identical shapes with respect to each other and, by cutting the sheet metal elements differently, three-dimensional volume bodies can be provided when the sheet metal elements of different shapes are stacked on top of one another in a package-like manner. In a particularly advantageous manner, it is possible to receive the coil elements at the sheet metal elements of the stator part and the magnet elements at the sheet metal elements of the rotor part.

Multipole motors are also known as torque motors and have coil elements, arranged on a circular path, which are in an oppositely facing relationship, for example, on the inner side, outer side or axially, to magnet elements also arranged on a circular path, so that a high-pole count, high-torque direct drive is formed.

In one aspect, in a particularly advantageous manner, the ratio of height to diameter of the substantially round, flat basic structure of the electronically commutated multipole motor can be at least 1:3, preferably at least 1:4, particularly preferably at least 1:5, and most preferably at least 1:8 or more. The ratio of height to diameter is given by the parallel spacing of the disk-shaped or cup-shaped stator part in relation to the disk-shaped or cup-shaped rotor part of the multipole motor to the diameter of the stator part and/or rotor part. The ratios of height to diameter of up to 1:8 or more can only be achieved in that the coil elements and magnet elements are arranged between the stator part and rotor part, and it has been shown that even basic structures of multipole motors reaching a ratio of height to diameter of more than 1:12 can be used as drives for revolving doors.

The flat disk-shaped constructional form of the multipole motor has the positive effect that a high torque, which is also necessary for the operation of a revolving door, can be achieved because the circumferential air gap radius between the coil elements and the magnet elements can be very large particularly when the multipole motor is constructed as an external rotor.

In another aspect, in a particularly advantageous manner, the stator part and/or the rotor part can have a disk-shaped or cup-shaped form determined by the basic shape of one sheet metal element and preferably more than one sheet metal element. The rotor part can extend substantially plane-parallel to the stator part, particularly in that, according to an aspect of the invention, the sheet metal elements of the stator part extend parallel to the sheet metal elements of the rotor part. If the stator part and preferably the rotor part have a cup-shaped form, at least one base area can form a sheet metal element and can likewise have a two-dimensional extension, wherein the cup shape can be produced, for example, by deep drawing or by metal spinning. For example, a cup-shaped rotor can cover the stator in the manner of a bell so that the coil elements and the magnet elements can be received protectively between the rotor part and the stator part by the cup shape of the rotor. Consequently, the rotor part can be formed of a quantity of sheet metal elements stacked one on top of the other in a package-like manner which extend in a plane, and a terminating sheet metal element can have, for example, a third dimension produced by deep drawing or metal spinning.

In another aspect, in a further advantageous manner, the sheet metal elements can have at least partially comb-like structural portions to form the stator part, and coil elements can be received at the structural portions, these coil elements being arranged in particular between the stator part and the rotor part. In addition to sheet metal elements for receiving the coil bodies, further sheet metal elements can be provided, which form the base structure of the stator. In particular, a bottom plate can be provided that extends over the entire two-dimensional cross section of the multipole motor. Conversely, the sheet metal elements with comb-like structural portions can be formed annularly or in a segmented manner and the comb-like structural portions can have coil teeth on which the coil bodies can be received.

According to a further advantageous aspect of the drive unit according to the invention, a plurality of magnet elements can be arranged between the stator part and the rotor part, wherein the magnet elements are arranged at a sheet metal element or at the sheet metal elements forming the rotor part. In particular, the magnet elements can be arranged at a plurality of sheet metal elements in such a way that the magnet elements extend over a plurality of edge faces of sheet metal elements stacked on one another in a package-like manner. In particular, the magnetic field circuit is further optimized in this way because the sheet metal elements extend in planes through which the flux lines of the magnetic field circuit pass. Consequently, the flux lines need not be conducted from one sheet metal element to the other sheet metal element but can propagate in the two-dimensional extension of each of the sheet metal elements.

The sheet metal elements can be formed at least partially of a magnetizable material, particularly a ferrous material. Metal materials with a magnetic permeability that can attain values of up to 15,000, for example, so that the materials have ferromagnetic properties in particular are especially advantageous. Amorphous metals or even nanocrystalline metals can preferably be used to form parts of the sheet metal elements which can have a distinctly increased permeability.

The sheet metal elements forming the stator parts and serving to receive the coil elements and/or the sheet metal elements forming the rotor part and serving to receive the magnet elements can each accordingly form a magnetic back iron in a simple manner. A magnetic back iron can be formed in an especially advantageous manner particularly when the material chosen for the sheet metal elements has ferromagnetic properties. In this respect, the material selected for the sheet metal elements for forming the stator part and/or for forming the rotor part need not be identical in principle. For example, the bottom plate of the stator and/or the cover plate of the rotor at which, for example, the component to be driven can be arranged can be made of a non-ferromagnetic material, for example, aluminum.

The sheet metal elements can extend two-dimensionally or annularly around the center axis of the multipole motor, which center axis can form the drive axis. In a particularly advantageous manner, however, the sheet metal elements can be formed by sheet metal segments which can be placed together and/or joined to one another particularly so as to be stacked on top of one another plane by plane to form a flat-cylindrical multipole motor. In this way, the use requirement for material for providing the sheet metal elements can be minimized, and half-moon-shaped or crescent-shaped sheet metal segments can be placed together in such a way that the sheet metal elements form a ring, for example, particularly for receiving the magnet elements or the coil elements. The sheet metal segments can be joined to one another by a bonding joining method or by connection elements when they are joined to one another within a plane and are stacked one on top of the other plane by plane.

In a another aspect, in further advantageous manner, the rotor part can be received by a bearing arrangement in an approximately plane-parallel arrangement at the stator part so as to be rotatable in the drive axis. The rotor part can have a substantially two-dimensional shape and, in order to introduce the magnet elements inside the ring in which or at which the coil elements are arranged, the rotor part can have a supporting portion for arranging the magnet elements. The stator part can likewise have a substantially planar extension and, merely in order to receive the coil elements, the stator part can have portions at which the coil elements are received. In a particularly advantageous manner, the magnet elements can be arranged on the outer side with respect to the coil elements, which are arranged on a circular path, so that the multipole motor is formed as an external rotor and a particularly high torque can be achieved. The bearing arrangement can have at least one rolling bearing, which can be constructed as an axial bearing. It is also possible to form the bearing arrangement at least partially by a plain bearing constructed as an axial and/or radial bearing.

The magnet elements can be arranged at the rotor part opposite the coil elements at the stator part so as to form a radial gap, so that the coil elements and the magnet elements can have an axial offset with respect to one another. The axial offset can be formed in such a way that the rotor part can be arranged at the stator part in a self-retaining manner by the magnetic action of the magnet elements. In so doing, the coil elements need not be energized and an axial force is exerted on the rotor part as a result of the axial offset of the magnet elements so that the rotor part is arranged in a self-retaining manner at the stator part. In particular, the force exerted by the axial offset can be configured in such a way that the bearing arrangement remains in joined arrangement between the stator part and the rotor part without requiring positively engaging holding elements to create a captive arrangement of the rotor part at the stator part.

In accordance with another aspect, the present invention is further directed to a revolving door with a drive unit with an electronically commutated multipole motor having a stator part arranged at a stationary structural component part of the revolving door and having a rotor part gearlessly connected to a turnstile of the revolving door, wherein the stator part and the rotor part are formed substantially of sheet metal elements stacked in a package-like manner, and wherein the sheet metal elements of the stator part and the sheet metal elements of the rotor part extend parallel to one another. The further features and accompanying advantages described above in connection with the drive unit are likewise taken into account in the revolving door according to the invention with a drive unit of the type mentioned above.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

In the following, further steps improving the invention are explained in more detail in connection with the description of preferred embodiments of the invention with reference to the drawings. In the drawings:

FIG. 1 is a diagram showing an exemplary embodiment of an arrangement of a multipole motor for forming a drive unit, in which the multipole motor has a rotor part and a stator part partially formed of sheet metal elements arranged so as to be stacked in a package-like manner;

FIG. 2 is a diagram showing a further exemplary embodiment of a drive unit with a stator part and a rotor part, in which the stator part and the rotor part are each formed in their entirety from sheet metal elements stacked on one another in a package-like manner; and FIG. 3 is a diagram showing a further exemplary embodiment of a drive unit constructed as an electronically commutated multipole motor and forming an internal rotor.

DETAILED DESCRIPTION OF THE PRESENTLY PREFERRED EMBODIMENTS

FIG. 1 shows an exemplary embodiment of an electronically commutated multipole motor 1 for forming a drive unit such as can be used, for example, to drive the turnstile in a revolving door. The multipole motor 1 has a stator part 10 and a rotor part 12. The stator part 10 initially comprises a support element 25 by which the stator part 10 is arranged at a structural component part 11 by screw elements 26. The stator part 10 further comprises a plurality of sheet metal elements 13 variously constructed with respect to their two-dimensional extension. A sheet metal element 13 extending substantially over the entire cross-sectional area of the stator part 10 is shown by way of example. Further sheet metal elements 13 have comb-like structural elements 15, and coil elements 16 are received on the teeth of the comb-like structural elements 15. The sheet metal elements 13 are stacked in a package-like manner one on top of the other by connection elements 27 in the form of screws, and the stacking direction of the sheet metal elements 13 corresponds to the extension direction of the drive axis 22 of the multipole motor 1.

The sheet metal elements 13 formed with a comb-like structure make it possible to arrange a plurality of coil elements 16 on a circular path so that a space is formed inside the coil ring formed by the coil elements 16 within which components can be received. A control unit 28, for example, which serves substantially to control the operation of the multipole motor, is shown inside the space enclosed by the coil elements 16. In particular, the electronic commutation of the coil elements 16 can be carried out by the control unit 28. An electric connection 29 is provided for this purpose between the control unit 28 and the coil elements 16, for example.

The rotor part 12 has, for example, a sheet metal element 14, which is formed in a cup-shaped manner by a forming process. A cover element 30 extending parallel to the sheet metal element 14 is arranged on the planar surface of the sheet metal element 14. Magnet elements 17 surrounding the coil elements 16 on the outer side are arranged inside the cup-shaped rotor part 12. Accordingly, the multipole motor 1 according to the depicted embodiment example is formed as a so-called external rotor.

Together with the coil elements 16, the magnet elements 17 form a radial gap 23 surrounding the drive axis 22 by which the magnet elements 17 are spaced apart from the coil elements 16 and the teeth of the comb-like structural elements 15 of the sheet metal elements 13. In so doing, an axial offset 24 is formed between the coil elements 16 and the magnet elements 17 so that the magnet elements 17 overlap the coil elements 16 on one side. In this way, an axial force is generated on the rotor part 12 in the direction of the drive axis 22 so that the rotor part 12 is held by magnetic force to the stator part 10 by the axial offset 24.

A bearing arrangement 19 rotatably receives the rotor part 12 extending in a plane-parallel manner with respect to the stator part 10, and the exemplary embodiment shows the bearing arrangement 19 with an axial and a radial plain bearing 21. An output shaft 31 is shown on the inner side of the bearing arrangement 19. This output shaft 31 is constructed, for example, as a splined shaft at which the turnstile of the revolving door can be arranged in a gearless manner. Alternatively, the turnstile of the revolving door can be arranged in a planar manner at the sheet metal element 14 or at the cover element 30.

The embodiment example of the multipole motor 1 shows that not all of the components of the stator part 10 and rotor part 12 need be formed of a plurality of sheet metal elements 13 and 14. Particularly advantageous embodiments of multipole motors 1 within the meaning of the present invention are described with reference to FIGS. 2 and 3, which have stator parts 10 and rotor parts 12 formed substantially exclusively of sheet metal elements 13 and 14.

FIG. 2 shows an exemplary embodiment of the multipole motor 1 with a stator part 10 arranged at a structural component part 11. The structural component part 11 can be the ceiling element or floor element of a revolving door, for example. The rotor part 12 is received at the stator part 10 so as to be rotatable by a bearing arrangement 19. The bearing arrangement 19 comprises a rolling bearing 20 and a plain bearing 21.

The stator part 10 is formed exclusively of planar sheet metal elements 13 stacked in a package-like manner one on top of the other and are held together by connection elements 27. The stacked sheet metal elements 13 are arranged at the structural component part 11 by screw elements 26. Parts of the sheet metal elements 13 are formed by structural elements 15 constructed in a comb-like manner and comprise teeth on which coil elements 16 are received. The coil elements 16 extend around the drive axis 22 on a circular path and accordingly form a coil ring. Magnet elements 17 received at the rotor part 12 are arranged outside the coil elements 16. The rotor part 12 likewise has a quantity of sheet metal elements 14 arranged so as to be stacked one on top of the other and the sheet metal elements 14 of the rotor part 12 are also held on one another by further connection elements 27.

The sheet metal elements 14 on which the magnet elements 17 are received have edge faces 18. The magnet elements 17 are received at the edge faces 18 of the sheet metal elements 14 so that a plurality of sheet metal elements 14 extend over the height of the magnet elements 17. The magnetic field circuit formed by the region of the sheet metal elements 14 extending on the back side behind the magnet element 17 is maximized in an optimal manner in this way. In this regard, the extension direction of the sheet metal elements 13 for forming the stator part 10 and of the sheet metal elements 14 for forming the rotor part 12 coincide in identical planes, and the structural elements 15 for receiving the coil elements 16 also cause the magnetic field circuit to be maximized at the back side of the coil elements 16.

Screw elements 26 are used for mounting the multipole motor 1 on the structural component part 11. In order to reach the screw elements 26 with a tool, the sheet metal elements 14 of the rotor part 12 have tool apertures 32. Consequently, the multipole motor 1 can be pre-assembled so as to be ready for use in order to arrange the multipole motor 1 at the structural component part 11 also when the rotor part 12 is already arranged at the stator part 10.

Finally, FIG. 3 shows a last exemplary embodiment of the multipole motor 1 with a stator part 10 and a rotor part 12, wherein the stator part 10 is formed of a plurality of sheet metal elements 13 stacked in a package-like manner one on top of the other and the rotor part 12 is likewise formed by a quantity of sheet metal elements 14 stacked in a package-like manner one on top of the other. In this connection, individual sheet metal elements 13 and 14 are formed two-dimensionally over the entire circumference of the flat, dish-like multipole motor 1 and form supporting sheet metal elements 13. Annularly formed sheet metal elements 13 receive the coil elements 16, and sheet metal elements 14, which are likewise annularly shaped form the receptacle for magnet elements 17. In this regard, the magnet elements 17 are arranged, for example, on the inner side of the coil elements 16 so that the embodiment example of the multipole motor 1 forms an internal rotor.

As an alternative to the annular configuration, the sheet metal elements 13 and 14 for receiving the coil elements 16 and magnet elements 17 can also be formed by sheet metal segments so that the sheet metal elements 13 and 14 need not be formed in their entirety as rings formed around the drive axis 42. The sheet metal elements 13 and 14 can be assembled from a plurality of sheet metal segments stacked on one another plane by plane to form a flat-cylindrical stator part 10 and a flat-cylindrical rotor part 12. This results in a multipole motor 1 that is likewise flat-cylindrical and formed of sheet metal elements 13 and 14, which can be produced by shear cutting methods or, for example, by laser cutting methods.

The rotor part 12 is rotatably received at the stator part 10 by a bearing arrangement 19. The bearing arrangement 19 has a rolling bearing 20 and a further rolling bearing 33. Rolling bearing 20 is constructed as an axial rolling bearing, and rolling bearing 33 is constructed as a radial rolling bearing. An output shaft 31 is shown on the inner side of the bearing arrangement 19.

The sheet metal element 14, which extends over the circumference of the rotor part 12, and which forms the base structure of the rotor part 14, is arranged at a hub element 34 by screw elements 35, and the output shaft 31 is received in the hub element 34. Further, the rolling bearings 20 and 33 are received at an annular body 36, which is a component part of the stator part 10.

The invention is not limited with respect to its construction to the preferred embodiment example indicated in the preceding. On the contrary, there are a number of conceivable variants which can be made use of by the demonstrated solution also in fundamentally different arrangements. All of the features and/or advantages, including constructional details or spatial arrangements, stemming from the claims, the description or the drawings may be essential to the invention both by themselves and in the most widely varying combinations. The construction of the stator part 10 and rotor part 12 by sheet metal elements 13 and 14 is determined by the basic structure of the stator part 10 and rotor part 12, and the stator part 10 and/or rotor part 12 can also comprise further components which are not formed as sheet metal elements 13 and 14. However, the basic idea of the invention is carried out in that the dish-like, approximately disk-shaped, flat-cylindrical form of the multipole motor 1 is produced in an extremely simple manner by sheet metal elements 13 and 14 on which the drive axis 22 forms a surface normal.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

What is claimed is:

1. A drive unit for a door, the drive unit comprising:
   an electronically commutated multipole motor (1) having:
      (i) a stator part (10) configured to be arrangable at a stationary structural component part (11); and
      (ii) a rotor part (12) configured to be gearlessly connectable to a rotationally drivable element,
   wherein the stator part (10) comprises a plurality of stator sheet metal elements (13) and the rotor part (12) comprises a plurality of rotor sheet metal elements (14), the stator sheet metal elements (13) and the rotor sheet metal elements (14) being stacked in a package-like manner, and wherein the stator sheet metal elements (13) and the rotor sheet metal elements (14) extend parallel to one another, and
   wherein a first subset of the plurality of stator sheet metal elements (13) extend substantially over the entire cross-sectional area of the stator part (10) and a second subset of the plurality of stator sheet metal elements have comb-like structural portions (15).

2. The drive unit according to claim 1, wherein the stator part (10) and/or the rotor part (12) have/has a disk-shaped or cup-shaped form formed by the shape of at least one of the sheet metal elements (13, 14), the rotor part (12) extending substantially plane-parallel to the stator part (10).

3. The drive unit according to claim 1, further comprising coil elements (16) arranged between the stator part (10) and the rotor part (12) and coupled to the structural portions (15).

4. The drive unit according to claim 3, further comprising a plurality of magnet elements (17) arranged between the stator part (10) and the rotor part (12), the magnet elements (17) being arranged at one or more of the rotor sheet metal elements (14).

5. The drive unit according to claim 4, wherein the magnet elements (17) are arranged at a plurality of rotor sheet metal elements (14) such that the magnet elements (17) extend over a plurality of edge faces (18) of the rotor sheet metal elements (14) stacked one above the other in a package-like manner.

6. The drive unit according to claim 1, wherein the stator and rotor sheet metal elements (13, 14) comprise a magnetizable material.

7. The drive unit according to claim 4, wherein the stator sheet metal elements (13) coupled to the coil elements (16) and the rotor sheet metal elements (14) coupled to the magnet elements (17) each form a magnetic back iron.

8. The drive unit according to claim 1, wherein the stator and rotor sheet metal elements (13, 14) comprise sheet metal segments configured so as to be placed together and/or joined to one another so as to be stacked on top of one another, plane by plane, to form a flat-cylindrical multipole motor (1).

9. The drive unit according to claim 1, further comprising a bearing arrangement (19) by which the rotor part (12) is rotatably coupled to the stator part (10) in an approximately plane-parallel arrangement, in a drive axis (22) of the multipole motor (1).

10. The drive unit according to claim 9, wherein the bearing arrangement (19) has at least one rolling bearing (20) configured as an axial bearing and/or the bearing arrangement (19) has at least one plain bearing (21) configured as an axial and/or radial bearing.

11. The drive unit according to claim 4, wherein the magnet elements (17) are arranged at the rotor part (12) opposite the coil elements (16) at the stator part (10) so as to form a radial gap (23), wherein the coil elements (16) and the magnet elements (17) have an axial offset (24) with respect to one another.

12. A revolving door with a drive unit according to claim 1.

13. The drive unit according to claim 1, wherein the door is a revolving door.

14. The drive unit according to claim 13, wherein the rotationally drivable element is a turnstile of the revolving door.

15. The drive unit according to claim 6, wherein the magnetizable material is a ferrous material.

* * * * *